United States Patent [19]

Reedy

[11] Patent Number: 5,631,653
[45] Date of Patent: May 20, 1997

[54] DYNAMIC INERTIAL COORDINATE SYSTEM MANEUVER DETECTOR AND PROCESSING METHOD

[75] Inventor: Robert W. Reedy, Manhattan Beach, Calif.

[73] Assignee: Hughes Electronics, Los Angeles, Calif.

[21] Appl. No.: 637,913

[22] Filed: Apr. 25, 1996

[51] Int. Cl.[6] .................................................. G01S 13/72
[52] U.S. Cl. ............................. 342/62; 342/77; 342/96; 342/97
[58] Field of Search .......................... 342/62, 63, 77, 342/81, 90, 95, 96, 97, 102, 162, 195

[56] References Cited

U.S. PATENT DOCUMENTS

| | | | |
|---|---|---|---|
| 4,649,390 | 3/1987 | Andrews et al. | 342/140 |
| 4,783,744 | 11/1988 | Yueh | 342/62 X |
| 5,341,142 | 8/1994 | Reis et al. | 342/64 |
| 5,341,143 | 8/1994 | Reis et al. | 342/64 |
| 5,483,240 | 1/1996 | Hsu et al. | 342/17 |
| 5,537,119 | 7/1996 | Poore, Jr. | 342/96 |

*Primary Examiner*—John B. Sotomayor
*Attorney, Agent, or Firm*—Leonard A. Alkov; Wanda K. Denson-Low

[57] ABSTRACT

A maneuver detector and processing method for use in target trackers employed in weapon guidance systems, and the like, that employs multidimensional measurements and a set of inertial coordinate systems. The maneuver detector and processing method are implemented as follows. Time-delayed target position and velocity estimates of the target are maintained in a history file. These estimates are continuously updated, in that they are transformed 24 into intermediate north, east, down (NED) range Cartesian coordinate systems by correcting for aircraft motion. For each measurement time, the histories are used to predict the position and velocity of the target in an "observation-relative" inertial coordinate system aligned with the line-of-sight to the target. The error between the prediction and observation is calculated and used with the measurement accuracies to calculate a maneuver probability.

7 Claims, 4 Drawing Sheets

DYNAMIC INERTIAL COORDINATE SYSTEM MANEUVER DETECTOR AND PROCESSING METHOD

BACKGROUND

The present invention relates generally to maneuver detectors for use in weapons control systems, such as guided missile control systems, and the like, and more particularly, to a maneuver detector that employs a dynamic inertial coordinate system that may be used during medium pulse repetition frequency (MPRF), high pulse repetition frequency (HPRF), and interleaved track-while-scan (TWS) tracking modes of a target tracker.

Conventional maneuver detection methods have heretofore been used to derive a maneuver indication. A maneuver detector has been developed that is used for adjusting range-rate gates which compares a current range-rate to saved values from three previous frames, and indicates a maneuver if the difference for a comparison is greater than a threshold value. In general, because its range/bearing coordinate system rotates, a range acceleration exists for a target that is not accelerating relative to an inertial coordinate system, i.e., one that moves in a straight line at a constant velocity. For aircraft and target velocities of 1000 fps, such a maneuver detector might be triggered by such a target at about 15 nautical miles. These coordinate system accelerations can be corrected for in a Kalman tracker by "line-of-sight-rate aiding". A similar correction must be made in the maneuver detector in order to keep coordinate system-induced accelerations from appearing as (or masking) maneuvers. This method relies on the measured value of range-rate, and does not directly allow for the position-derived maneuver detection required for medium pulse repetition frequency (MPRF).

A single measurement of a parameter (such as range-rate) and a prediction of the value of that parameter under non-maneuvering conditions has been used to calculate a residual (the deviation of that parameter from an expected value if there is no maneuver). Then, the probability of obtaining a deviation at least that large under the null hypothesis (that there is no maneuver) is estimated. The residual (observed value less predicted value) of range, range-rate, etc., is normalized by values of track and measurement errors and compared to a distance threshold. Single frame indicators and smoothed versions thereof use only a single frame of time over which the prediction acts to derive an error. Analyses of an APG-71 tracker manufactured by the assignee of the present invention has shown that position measurement errors tend to be of similar magnitude to the change in these parameters that can be expected to develop over a frame time due to a target maneuver. Furthermore, in APG-71 track-while-scan mode, the filters include acceleration models, and to the degree that these models accurately represent a target acceleration, the acceleration term is included in the prediction to next frame and therefore does not show up in the residual. Consequently, a special prediction without the acceleration term must be made to use this method.

The rate-of-change of filtered velocity states has been used to calculate an acceleration for a target, and the magnitude of this acceleration vector is used to indicate maneuvers. This method is used in a maneuver detector used in an AWG-9 weapons control system manufactured by the assignee of the present invention. As in the first-described method, this method does not directly allow for a position-derived maneuver detection required for MPRF. Also, filtered north, east, down velocity states are slow (relative to the observation) in reacting to a maneuver, and mix the larger variances from coordinates oblique to the line-of-sight to the target (e.g., azimuth rate) into measurements along the range coordinate (e.g., range-rate), thus diluting their accuracy.

Several measurements of a parameter have been used to obtain a curve fit to a non-maneuvering model, and a goodness-of-fit parameter is used to estimate the probability that the measurements are consistent with that model. Several measurements of a parameter have been used to obtain a curve fit to a model allowing a maneuver, and the significance of the maneuver terms is used to indicate whether there is a maneuver. Measurements have been compared to a set of models consisting of several possible maneuvers as well as a no-maneuver model (e.g., a bank of Kalman filters representing different maneuver hypotheses), and the best fitting model is chosen.

Accordingly, it is an objective of the present invention to provide for an improved maneuver detector that is simpler, more accurate, and more generally applicable. It is a further objective of the present invention to provide for a maneuver detector that may be used during medium pulse repetition frequency, high pulse repetition frequency, and interleaved track-while-scan tracking modes of a target tracker.

SUMMARY OF THE INVENTION

To meet the above and other objectives, the present invention provides for a maneuver detector or detection method for use in MPRF, HPRF, and interleaved TWS tracking modes of a target tracker. The maneuver detector was conceived as part of an upgrade program to add missile support capability to an AN/APG-71 weapons control system used in military aircraft. The present maneuver detector can be used to improve track quality, reduce track splits and drops (due primarily to observations that are not correlated with tracks, especially during target maneuvers towards beam aspect), and improve tracking parameter uncertainty estimates sent to a guided missile.

One implementation of the maneuver detector is as follows. Time-delayed target position and velocity estimates are maintained in a history file. These estimates are continuously updated, in that they are transformed into an intermediate NED range Cartesian coordinate system by correcting for aircraft motion. For each measurement time, the histories are used to predict the position and velocity of the target in the "observation-relative" inertial coordinate system aligned with the line-of-sight to the target. The error between the prediction and observation is calculated and used with the measurement accuracies to calculate a maneuver probability.

More particularly, the present method is used in a target tracking system disposed in an aircraft that is employed to detect a maneuvering target. The method comprises the following steps. Time-delayed target position and velocity estimates of a moving target are determined. The time-delayed target position and velocity estimates are stored in a history file. The time-delayed target position and velocity estimates are continuously updated by transforming into an intermediate north, east, down, range Cartesian coordinate system by correction for motion of the sensor platform aircraft. For each measurement time, the updated time-delayed target position and velocity estimates are used to predict the position and velocity of the target in an observation-relative inertial coordinate system aligned with the line-of-sight between the aircraft and the target. An error between the predicted position and velocity of the target and the current observed position and velocity of the target is calculated. A maneuver probability that is indicative of whether the target is maneuvering is then calculated using the error and predetermined measurement accuracies of the target tracking system.

The present method was developed for detecting target maneuvers by comparison of measurements and trackfile-based predictions in a set of inertial coordinate systems. The present method allows the predictions to be done in an inertial frame, allowing sensitive detection without requiring complicated corrections for coordinate system acceleration. At the same time, measurements with differing accuracies can be used, each contributing to the degree justified. The full precision of the individual measurement states (e.g., high-accuracy range, medium-accuracy range, range-rate, azimuth, elevation) can be used without the degradation which would be caused by transforming into coordinates which do not coincide with those of the measurement system. Thus sensitive and accurate results are obtained from a simple mechanization.

Most maneuver detectors operate by comparing measured features of parameters to those predicted using a non-maneuvering model, either (1) in the measurement coordinate system, e.g., by comparing the measured value of range-rate to that predicted from the trackfile parameters, or (2) in an inertial coordinate system, e.g., by transforming observations into north-referenced Cartesian coordinates and comparing these with inertial-frame productions from trackfile parameters. In the former case, the fact that the coordinate system is accelerating necessitates the use of correction term approximations (such as line-of-sight-rate aiding) to obtain an accurate prediction. In the latter case, sensitivity can be degraded when components of measurements of a high-accuracy state combine with those of a lesser-accuracy state in the transformation to the inertial coordinate system.

In the present method, measurements or parameters (e.g., range, range-rate, azimuth, elevation) are made in a non-inertial coordinate system which has its origin at the platform's position. Each measurement time can be considered to define a unique inertial Cartesian coordinate system with (1) origin at the position of the platform, and (2) coordinate axes aligned relative to the measurement system: range along line-of-sight to the observation, distance from line-of-sight in the azimuth direction, and distance from line-of-sight in the elevation direction. Measurement parameter errors are calculated in this (stationary) system, which can be considered to exist throughout time but only be used at the measurement time; that is, for 'n' measurements, there exist 'n' inertial coordinate systems, each of which are used to compute the difference between predicted and observed values at one measurement time.

The first advantage of this choice of coordinates is derived from the fact that trackfile histories, which are the best smoothed (not predicted) estimate of position and velocity at some time in the past, can easily be transformed into these coordinates (using ownship navigation data and observation data) and used to predict the position and velocity of the target at the measurement time, using a simple non-maneuvering model (unaccelerated motion). Secondly, because of the alignment of the primary axis of these coordinates along the line-of-sight, the measurement lies on this primary axis and the error (difference between measured and predicted values) can be calculated directly, without mixing states with varying accuracies.

A single observation is used because of a requirement for the fastest possible detection of maneuvers. Outputs of the maneuver detector may be correlated over time if a smaller false alarm rate is required.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
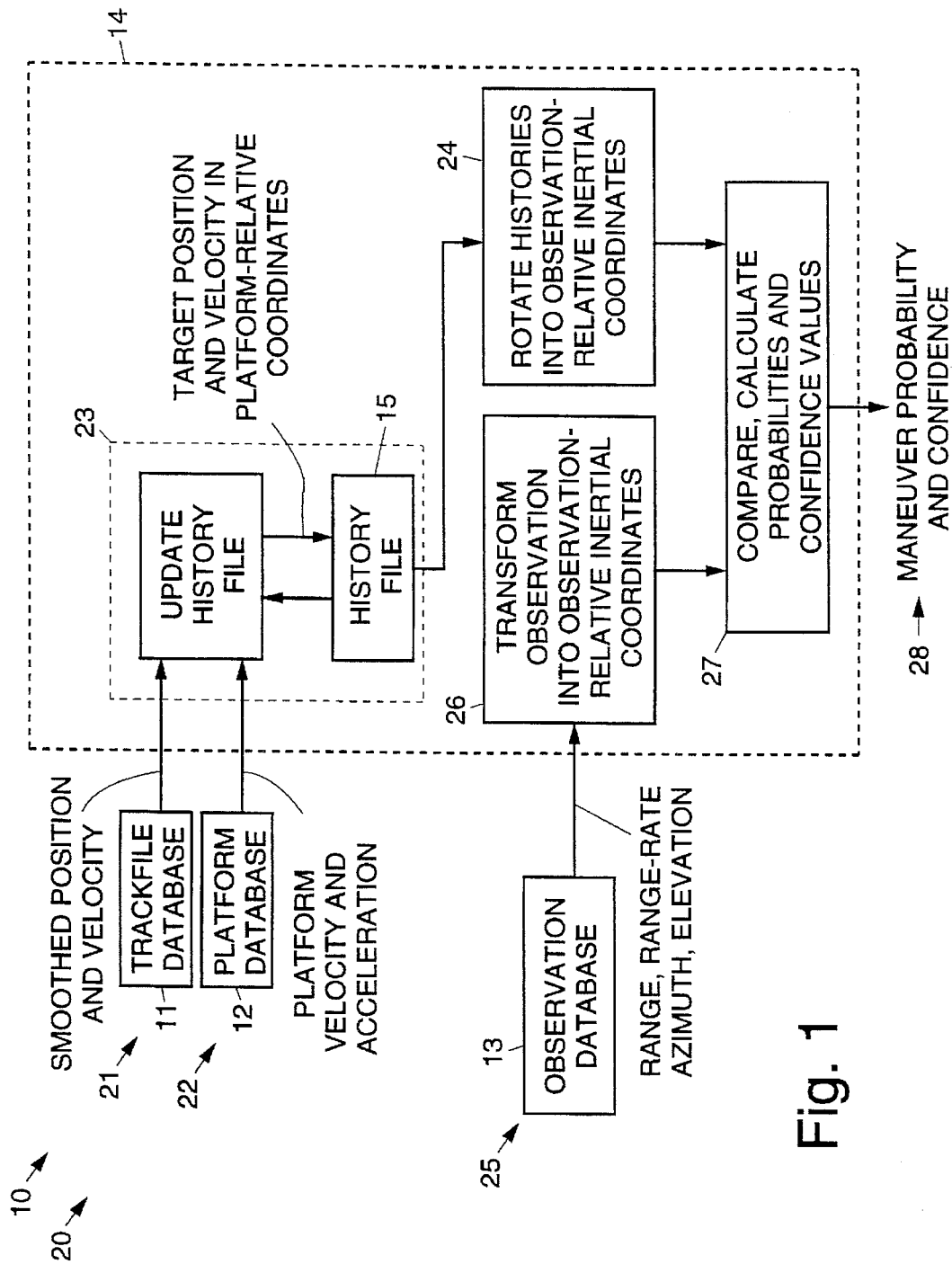
FIG. 1 is a diagram illustrating a maneuver detector or maneuver detection method in accordance with the principles of the present invention.

By way of introduction, in HPRF and MPRF, and interleaved TWS modes, an AN/APG-71 weapons control system, for example, receives target observations that include measurements of range, range-rate, azimuth, and elevation. The interleaved TWS mode includes alternating bars of HPRF and MPRF waveforms. In HPRF mode, range-rate is typically very accurate, but jet engine modulation (JEM) can cause observations with an incorrect range-rate. Range is determined using frequency modulated ranging (FMR) techniques and is fairly accurate. In MPRF mode, velocity is declared "confident" or "not confident", and in the latter case, the range-rate value may be incorrect by a considerable amount. MPRF range is extremely accurate. In both HPRF and MPRF modes, range and/or range-rate may be declared invalid under certain conditions, such as jamming conditions.

The maneuver detector in this system uses both position (range, bearing) and velocity (range-rate) measurements for maneuver detection, according to the accuracy of a currently available measurement. The range-rate measurement is often the basis for maneuver detection in both HPRF and MPRF modes, but the range measurement may be used in MPRF mode for observations without confident velocity. Maneuver indications derived from filtered parameters (such as acceleration) or multiple observations are not relied upon because they are too slow.

It was found that using changes in filtered parameters, or more than one observation, introduced an unacceptable lag in the maneuver detector. Thus it was decided that the present maneuver detector would operate on a single observation, and a higher false alarm rate from measurement errors would be accepted in trade for a decreased lag time. The present maneuver detector utilizes particular coordinate systems to allow the most accurate maneuver measurement as will be discussed below.

In the present maneuver detector, the best estimate of a target parameter measured at some time in the past is used to predict that parameter at the time of observation, assuming constant-velocity, straight line motion (no-maneuver model). This prediction is compared to an actual observation measurement of the parameter at the time of observation. Residuals are processed to determine the probability that the target is maneuvering, and thus provide a maneuver indication. Range-rate is a measurement used for maneuver indication because it is an effective early indicator of maneuvers for HPRF and MPRF with confident velocity.

Additionally, in order to perform maneuver detection in MPRF mode in the absence of confident velocity, a position measurement is used for maneuver detection. To the extent that position measurements are less susceptible to jet engine modulation (JEM) than are range-rate measurements, a position-derived maneuver indicator is preferable to a range-rate-derived one, in that it reduces overall maneuver false alarms due to JEM and allows identification of JEM observations. The simplest method is to use histories of range ($r_h$) and range rate ($rdot_h$) delayed over some time period ($\Delta t$) to provide a current range prediction ($r_p$) that is compared to the current observation:

$$r_p = r_h + rdot_h \cdot \Delta t.$$

However, there are several problems with this method. Target range is measured in a non-inertial coordinate system, i.e., one in which a target which is undergoing unaccelerated motion (no maneuver) does not in general travel in a straight line at constant velocity. Thus, this constant range-rate model represents a non-maneuvering target only to the degree to which the line-of-sight component of rdot does not change as the target's bearing changes. This model degrades at short range for cases in which the target and aircraft are not flying directly at each other. To correct for this error, a line-of-sight-rate aiding term, integrated over $\Delta t$, is added to the prediction, and with its added complexity, this introduces additional errors due to the estimation of angle rates needed for the correction term. An ownship acceleration correction integrated over $\Delta t$ is also added to keep ownship maneuvers from triggering the maneuver detector or masking target maneuvers.

Rather than introducing the complexity (and error) of these corrections, a design was developed that transforms target measurements into an inertial coordinate system. This is a natural frame for measuring maneuvers, since unaccelerated motion (a non-maneuvering target) is represented by constant velocity, straight-line motion in that system. An advantage to using the inertial coordinate system is that there is no required line-of-sight-rate acceleration correction. Also, in an inertial coordinate system, it is easy to calculate actual target motion. Ownship velocity and acceleration parameters are in Cartesian coordinates, simplifying ownship motion correction.

In using the inertial coordinate system, care must be taken that measurement errors are not mixed between coordinates. For example, if one were to use "north" and "east" as measurement coordinates when the target is to the northeast, the accurate range measurements in the inertial coordinate system would be corrupted because they are mixed with a less accurate cross-line-of-sight position measurement derived from observation angles. Also, maneuver detector performance would depend upon absolute target bearing. This corruption can be minimized by defining a coordinate of the inertial system to be approximately along the range measurement direction. Consequently, the inertial coordinate system must be different for each observation. The measured parameters must be rotated into the inertial coordinates.

In order to allow rotation of the histories into inertial coordinates, the values along two or three orthogonal axes must be maintained, rather than just one. This permits use of cross line-of-sight coordinate measurements (derived from angle measurements), allowing maneuver detection in these orthogonal dimensions.

With the above in mind, and referring to the drawing figures, FIG. 1 illustrates a maneuver detector 10 and maneuver detection method 20 in accordance with the principles of the present invention. The maneuver detector 10 comprises a trackfile database 11 that contains smoothed position and velocity estimate data of a moving target, and a navigation database 12 that contains velocity and acceleration data for the moving aircraft, and an observation database 13 that contains observed data including range, range-rate, azimuth and elevation data of the target. A processor 14 is provided for processing the data from the trackfile and navigation databases 11, 12 to generate an updated history file 15 containing target position and velocity estimates in aircraft-relative coordinates. The processor 14 rotates the target position and velocity estimates from the history file into observation-relative inertial coordinates, and transforms the observed data into observation-relative inertial coordinates. The processor 14 compares the transformed data target position and velocity estimates to observed target position and velocity values, and calculates and outputs probilities and confidence values indicative of whether the target is maneuvering.

The maneuver detection method 20 comprises the following steps. A trackfile database 11 is generated 21 that contains smoothed position an velocity estimates of a moving target. A navigation database 12 is generated 22 that contains velocity and acceleration data for the moving aircraft. The data from the trackfile and navigation databases is processed 23 to generate an updated history file containing target position and velocity estimates in aircraft-relative coordinates. The target position and velocity estimates from the history file are rotated 24 into observation-relative inertial coordinates. An observation database 13 is generated 25 that contains observed data comprising range, range-rate, azimuth and elevation data of the target. The observed data are transformed 26 into observation-relative inertial coordinates. The transformed data target position and velocity estimates are compared 27 to observed target position and velocity values to calculate probilities and confidence values 28 indicative of whether the target is maneuvering. The probilities and confidence values 28 are then output.

In a reduced-to-practice embodiment of the maneuver detector 10 and processing method 20, three parameters, including position along the line-of-sight direction to a target ($Z_x$), position in a cross-line-of-sight direction ($Z_y$), and velocity along the line-of-sight direction ($V_{zx}$), are used to estimate maneuver probabilities. For these calculations, the values derived from an observation are compared to those predicted from two-frame-ago histories of a best estimate of target position and velocity, which corresponds to smoothed position and velocity values derived from a Kalman filter, for example. Predicted values calculated using a maneuver model would be inappropriate for use as the best estimate of the position and velocity of the target. The maneuver detector 10 and method 20 uses accurate historical estimates to predict motion in the non-maneuvering model.

Figure 2:
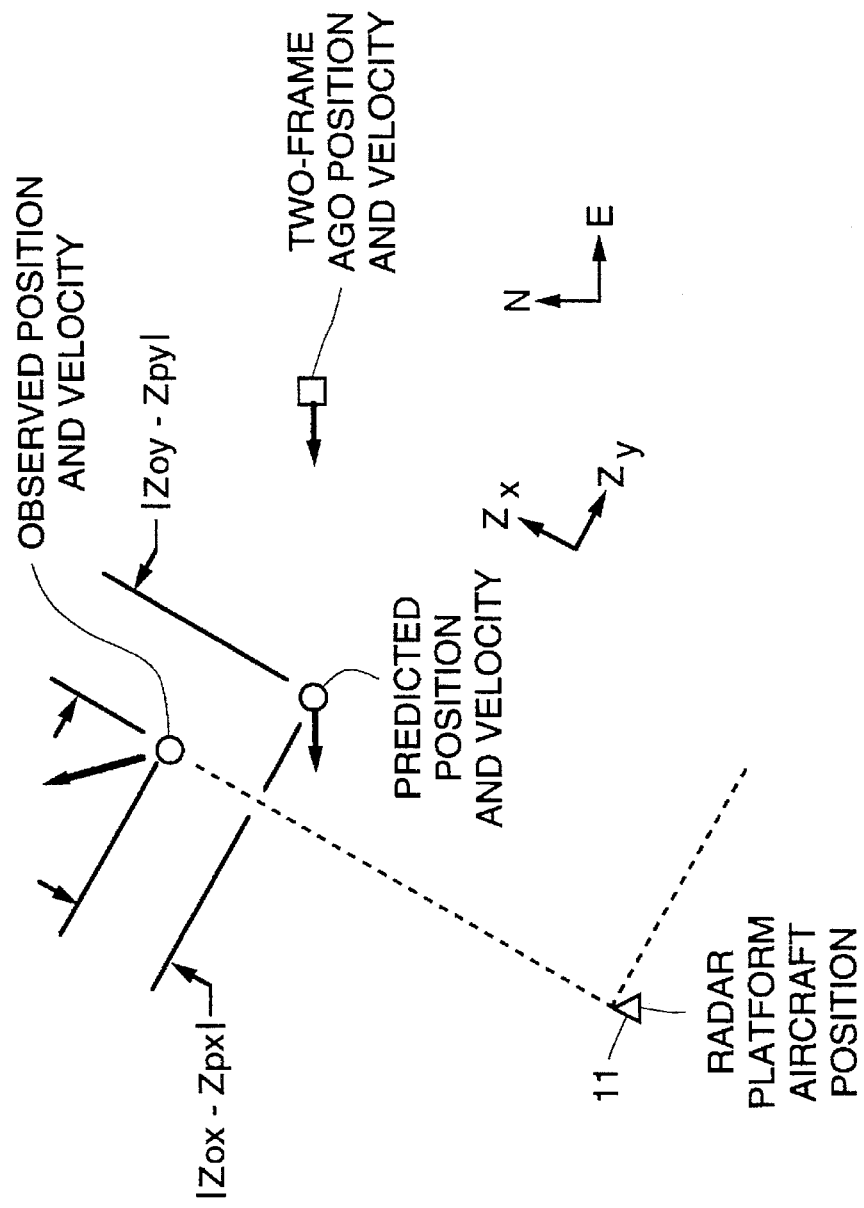
FIG. 2 illustrates an inertial coordinate system that is employed in the present invention.

Maneuver calculations are performed in a two-dimensional $Z_x$-$Z_y$ plane, rather than three-dimensional space, to reduce the storage requirements in the track file database 11. A (right-handed Cartesian) inertial coordinate system in which maneuvers are calculated ("Z coordinates") is defined relative to the position of the aircraft and the bearing of the observation. The inertial coordinate system is shown in FIG. 2. The x-axis ($\hat{Z}$) and the y-axis ($\hat{Z}_y$) lie in the horizontal plane (coplanar with $\hat{N}$ and $\hat{E}$ in a earth-stabilized system); the origin is at the position of the aircraft at the time of observation. $\hat{Z}$ is oriented along the horizontal projection of the line-of-sight to the observation, with $\hat{Z}_y$ perpendicular to it such that $\hat{Z}_z$ is oriented downward.

In order to simplify update of smoothed position and velocity histories, they are maintained in a North, East coordinate system with the origin at the position of the aircraft. The histories are updated 23 each frame for the motion of the aircraft, using end-of-frame aircraft velocity and acceleration measurements which are valid at approximately the center of a one-frame update interval.

Processing includes three major functions: history updating 23, variance estimation and probability estimation 27. The following processing is performed for each track on each frame. The term "observation" means the observation, if any, which updates the track on the current frame.

The history updating 23 function maintains the one-frame-ago and two-frame-ago histories of the position and velocity of the target. The history updating 23 is performed after the probability calculation, to provide a two-frame-ago history using only two history storage allocations. For each frame, if the track is updated with an observation, the smoothed position and velocity values (range, north and east direction cosines, north and east smoothed velocities) are transformed into a horizontal two-dimensional Cartesian coordinate system with axes oriented in the North and East directions ($X_n$, $X_e$, $V_n$, $V_e$). These are corrected for aircraft motion to $T_t$ (time of track) which is one frame ahead; the aircraft parameters used for this correction are valid at the end of the frame, i.e., approximately the center of this update interval. The result, along with the time of observation (the time at which the smoothed values are valid), is stored in the track file as the one-flame-ago history.

If the track is not updated with an observation, the previous one-flame-ago history is updated for aircraft motion and stored as the current one-flame-ago history. The previous one-flame-ago history is similarly updated by the aircraft motion and stored as the two-flame-ago history. The position of the target relative to the earth in these histories does not change, only the position of the origin of the coordinates (the aircraft) changes.

The variance estimation function is as follows. For each parameter ($Z_x$, $Z_y$, $V_{zx}$) for which a probability estimate is calculated, the variance in the error (difference between observed and predicted values) of that parameter is estimated. This variance is used in the probability estimation computation.

If the track file is updated with range, the $Z_x$ and $Z_y$ variances are estimated. These are calculated as the sums of the variances of the observed and predicted values:

$$S_{zx} = S_{zxo} + S_{zxp}, \text{ and } S_{zy} = S_{zyo} + S_{zyp}.$$

For the observation, the $Z_x$ variance is estimated by propagation of error from its component measurements:

$$S_{zxo} = \sigma_o^2(R)\cos^2(EL_o) + R_o^2\sigma_o^2(EL)\sin^2(EL_o)$$

where $R_o$ is the observation range, $EL_o$ is the observation elevation, $\sigma_o^2(R)$ is the observation range variance, and $\sigma_o^2(EL)$ is the observation elevation variance.

Since $\hat{Z}_y$ is defined to be perpendicular to the direction to the observation, the variance, as well as position, along that coordinate is zero (the error in coordinate system alignment is included in the prediction variance):

$$S_{zyo} = 0$$

For the predictions, the variance for each of $Z_x$ and $Z_y$ is estimated to be the sum of two variances, (1) the variance of the position due to the errors in the position history, and (2) the propagation of the velocity history variance by the prediction interval (the difference between the observation time and the time to which the two-frame-ago history is valid):

$$S_{zxp} = S_{zxh} + \Delta T^2 \cdot S_{Vzxh}$$

$$S_{zyp} = S_{zyh} + \Delta T^2 \cdot S_{Vzyh}$$

The $Z_x$ position history variance is modeled as the square of a linear function of the number of missed MPRF updates, up to a maximum of three, at which point it becomes a constant:

$$S_{zxh} = (\min(C_1 + C_2 \cdot n_{miss}, C_3))^2$$

where $C_1$ is the modeled sigma for no missed updates, $C_2$ is the modeled increase in sigma per missed update, and $C_3$ is modeled sigma for three missed updates, where the assumption is that missing more than three MPRF updates does not substantially increase the position history variance.

The $Z_x$ velocity history variance is modeled as a constant, representing a typical track file velocity variance in a direction along the line of sight to the target:

$$S_{Vzxh} = C_4^2.$$

The $Z_y$ position and velocity history variances are modeled as squared linear functions of the target range:

$$S_{zyh} = (C_5 \cdot R_p + C_6)^2$$

$$S_{vzy} = (C_7 \cdot R_p)^2$$

where $R_p$ is the predicted target range from the track file. This represents a constant angular error model, $\delta y = (\text{range } \delta\theta) + \text{bias}$, where bias ($C_6$) includes coordinate system alignment error and disappears in the derivative (velocity).

If the track file is updated with range-rate the $V_{zx}$ variance is estimated in a similar fashion, being calculated as the sum of the variances of the observed and predicted values:

$$S_{Vzx} = S_{Vzxo} + S_{Vzxp}.$$

For the observation, the variance calculation is:

$$S_{vzxo} = \sigma_o^2(RDOT)/\cos^2(EL_o) + (RDOT_o + V_{ILOSo})^2 \tan^2(EL_o)\sigma_o^2(EL)/\cos^2(EL_o),$$

where $RDOT_o$ is the observation range-rate, $\sigma_o^2(RDOT)$ is the observation range-rate variance, and $V_{ILOSo}$ is the component of ownship (aircraft) velocity along the line-of-sight to the target.

For the prediction, the variance for $V_{zxp}$ is estimated to be equal to the $Z_x$ velocity history variance which was used in the $S_{zxp}$ calculation; i.e., the velocity variance is assumed constant over time for the non-maneuvering model:

$$S_{Vzxp} = S_{Vzxh} = C_4^2.$$

Probability estimation calculations are performed for $Z_x$ and $Z_y$ only if the track file is updated with range on the current frame, and for $V_{zx}$ only if the track file is updated with range-rate on the current frame.

The primary outputs of the maneuver detector 10 and method 20 are a smoothed maneuver probability estimate (range [0,1]) and a confidence ($QM_o$) in the probability estimate (range [0,1]). A probability value, rather than a binary maneuver indication, is produced in order to allow other functions to make use of the value as appropriate to their application and level of required conservativeness.

Let "i" stand for any of the three maneuver measurement parameters ($Z_x$, $Z_y$, $V_{zx}$). Then, the probability that there is a maneuver, calculated for each parameter, is estimated as:

$$P_{mhex} \sim PM_i = 1 - 2G(0, \sigma_i, |e_i|)$$

where $G(\mu,\sigma,x)$ is the integral of a Gaussian probability function with mean $\mu$ and standard deviation $\sigma$ from x to infinity; $PM_i$ is $PM_{zy}$, $PM_{zy}$, or $PM_{vzx}$; $e_i$ is the error (difference between observed and predicted values of the parameter), and $\sigma_i = (S_i)^{1/2}$.

The value of $QM_i$, the estimate of the confidence in the probability, is given by:

$$QM_i = 1 - 2G(0, \sigma_i, c_i)$$

where $c_i$ is a constant representing the error expected for a barely detectable maneuver. This $QM_i$ is used when the probability that there is no maneuver is required; this is estimated as:

$$P_{\overline{mlex}} \sim QM_i \cdot (1 - PM_i).$$

For each frame, $PM_{max}$ is calculated as the maximum of $PM_{zx}$, $PM_{zy}$, and $PM_{vzx}$; the smoothed maneuver probability is then calculated as the maximum of $PM_{max}$ on the most recent three frames. $QM_s$ is the $QM_i$ value corresponding to the $PM_i$ to which $PM_s$ was set; e.g., if $PM_s$ is $PM_{zy}$ from two frames ago, then $QM_s$ is $QM_{zy}$ from two frames ago.

The errors $e_i$ are calculated as:

$$e_{zx} = Z_{ox} - Z_{px},$$
$$e_{zy} = Z_{oy} - Z_{py},$$
$$e_{Vzx} = V_{zox} - V_{zpx}$$

where the observations in Z-coordinates are (using the non-maneuvering assumption that the target velocity vector lies in the horizontal plane):

$$\vec{Z}_o = \begin{bmatrix} R_0 \cos(EL_o) \\ 0 \end{bmatrix}$$

$$V_{zxo} = (RDOT_o + V_{ILoSo})/\cos(EL_o)$$

and the predictions in Z-coordinates are:

$$\vec{Z}_p = \begin{bmatrix} Z_{px} \\ Z_{py} \end{bmatrix} = \vec{Z}_s + \vec{V}_{zs} \cdot \Delta T_2,$$

$$\vec{V}_{zp} = \begin{bmatrix} V_{zpx} \\ V_{zpy} \end{bmatrix} = \vec{V}_{zs}$$

where the smoothed history values in Z-coordinates are:

$$\vec{Z}_s = \begin{bmatrix} Z_{sx} \\ Z_{sy} \end{bmatrix} = \tilde{R} \cdot \vec{X}_{h(n-2)} \cdot \Delta \vec{X}_{os},$$

$$\vec{V}_{zs} = \begin{bmatrix} V_{zsx} \\ V_{zsy} \end{bmatrix} = \tilde{R} \cdot \vec{V}_{h(n-2)}.$$

$\vec{X}_{h(n-2)}$ has corrected for ownship motion to the time of track $T_t$ by history updating; $\Delta \vec{X}_{os}$ corrects it to the time of observation.

The history prediction interval is:

$$\Delta T_2 = (TR_o - T_{h(n-2)})$$

and the ownship motion correction to the time of observation is:

$$\Delta \vec{X}_{os} = \vec{V}_{IEOF} \Delta \vec{T}_I + 0.5 \cdot \vec{A}_{IEOF} \Delta T_1^2 \cdot \text{sign}(\Delta T_1)$$

$$\Delta T_1 = (TR_o - T_T)$$

and the Z-coordinate rotation matrix is:

$$\tilde{R} = \begin{bmatrix} \cos(AZ_0) & \sin(AZ_0) \\ -\sin(AZ_0) & \cos(AZ_0) \end{bmatrix}$$

and the platform aircraft end-of-frame velocity and acceleration vectors are:

$$\vec{V}_{IEOF} = \begin{bmatrix} VIN_{EOF} \\ VIE_{EOF} \end{bmatrix}$$

$$\vec{A}_{IEOF} = \begin{bmatrix} AIN_{EOF} \\ AIE_{EOF} \end{bmatrix}.$$

An approximation for $G(\mu, \sigma_i, |e_i|)$ (to be used in the calculations of the $PM_i$ and $QM_i$) is $$G(\mu, \sigma_i, |e_i|) \cong G'(\mu, \sigma_i, |e_i|) = \frac{1}{2 + (x + \mu) + 3 \cdot (x - \mu)^2},$$

$$x = \frac{|e_i|}{\sigma_i}.$$

The performance of the present invention has been analyzed and is discussed below. The primary maneuver driving the design of the maneuver detector 10 and method 20 was a target turn from nose aspect to beam aspect. If the observation errors are modeled as having one-sigma values of 200 ft., 7 fps., and 0.8 degrees for range, range-rate, and azimuth respectively, then 'detectable' maneuvers in the $Z_x$, $V_{zx}$, and $Z_y$ parameters might correspond to errors of approximately 400 ft., 14 fps., and 1.6 degrees, respectively, considering a detectable maneuver to be one in which the error exceeds $2\sigma$ for the observation.

Figure 3:
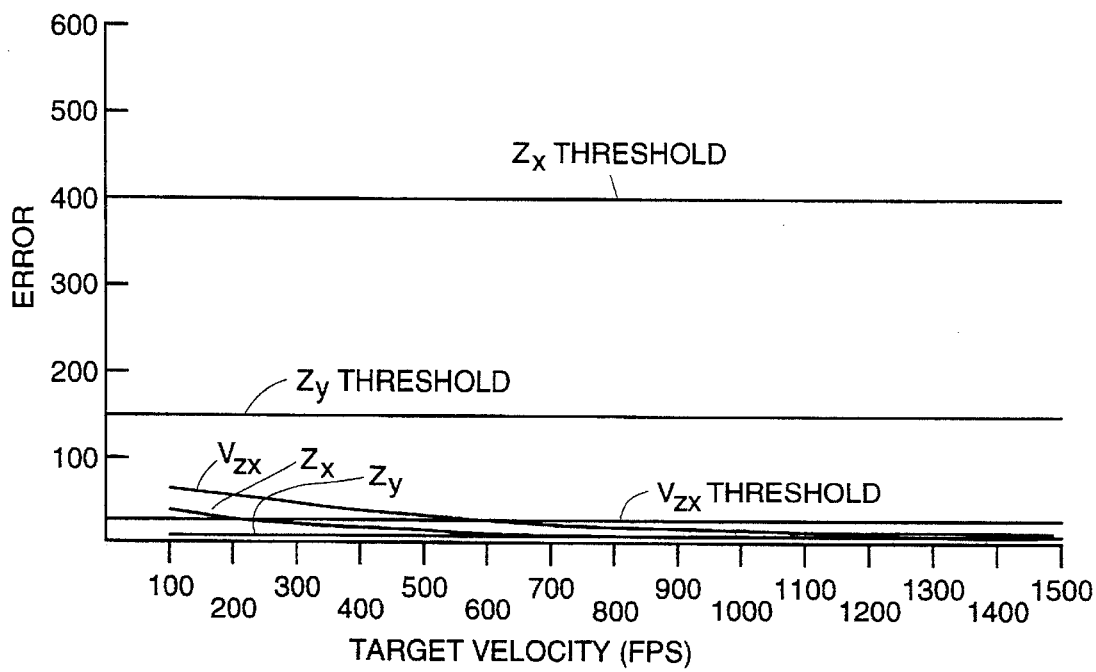
FIG. 3–6 are graphs showing theoretical error versus target velocity obtained using the maneuver detection method of the present invention.
Figure 4:
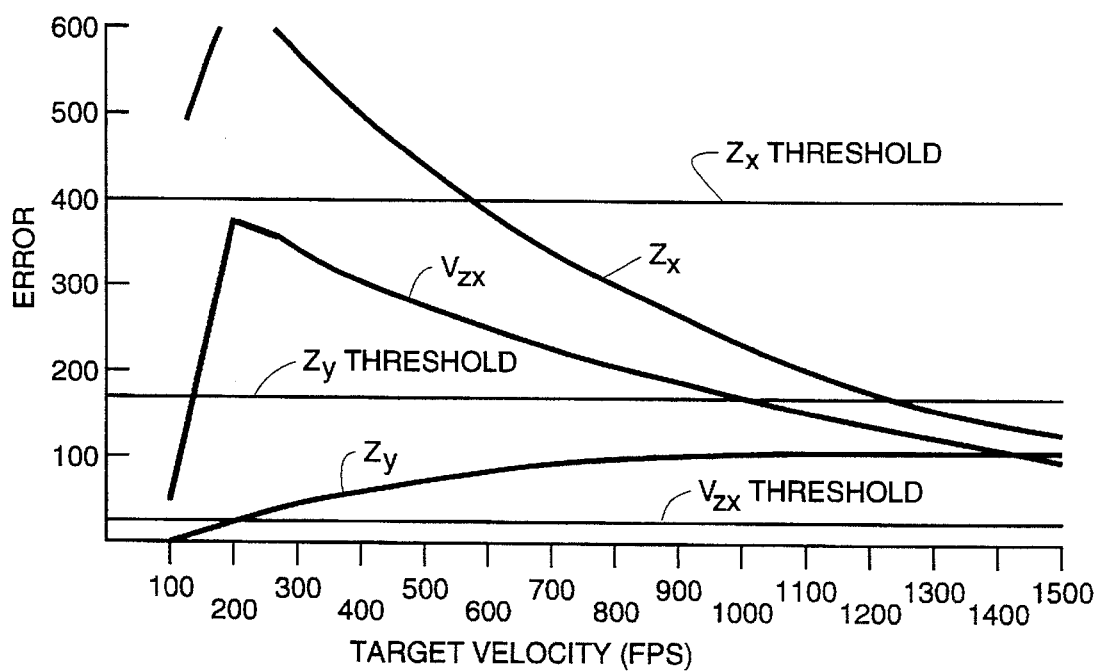
Figure 5:
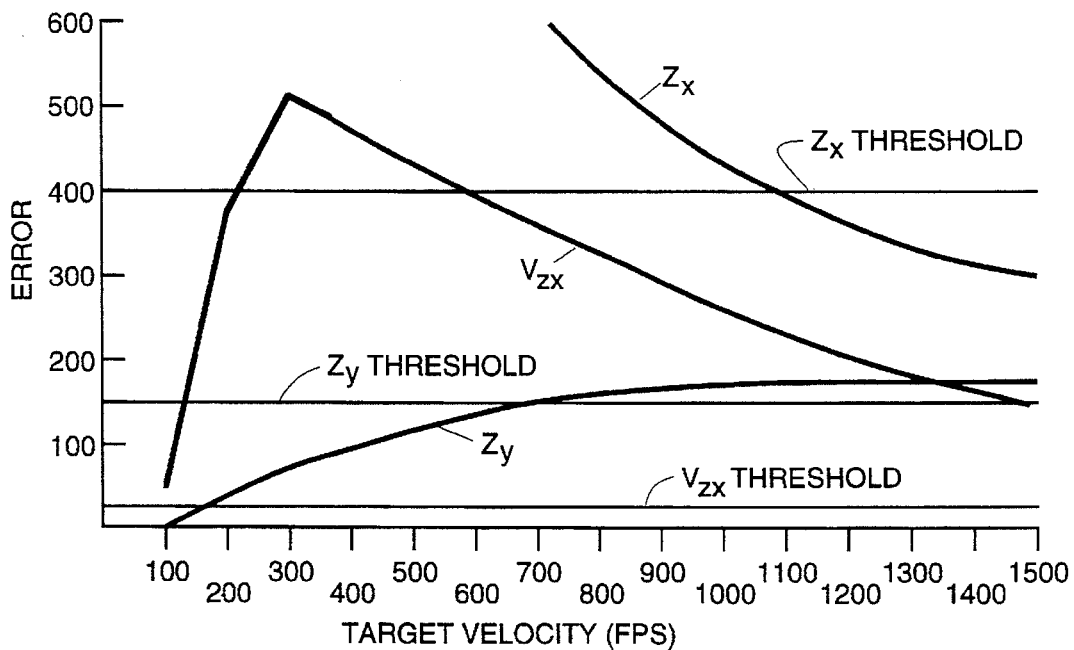
Figure 6:
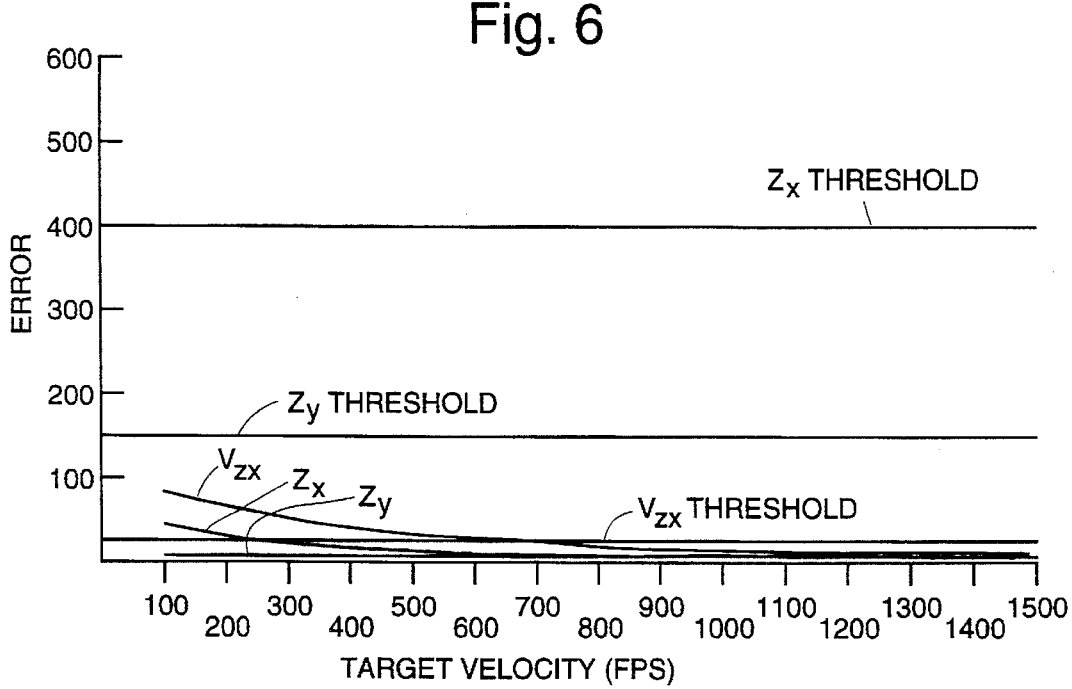

Referring to FIGS. 3–6, they show graphs illustrating theoretical error versus target velocity obtained using the maneuver detector 10 and method 20 of the present invention. FIGS. 3–6 show the expected error relative to a non-maneuvering model for each of the three parameters; each figure has a different elapsed time since start of maneuver (T) and acceleration constant. The error scale traits for the three parameters are: $Z_x$, ft.; $Z_y$, 0.01 degrees; $V_{zx}$, fps ($Z_y$ is presented in angle traits in order to allow a constant detection threshold). In FIG. 3, g=4, T=1 second, range=10 nautical miles, and vco90deg=82. In FIG. 4, g=4, T=4 seconds, range=10 nautical miles, and vco90deg=328. In FIG. 5, g=4, T=5.5 seconds, range=10 nautical miles, and vco90deg=451. In FIG. 6, g=5, T=0.9 seconds, range=10 nautical miles, and vco90deg=92.

In this model, the radius of the target turn is considered to be small relative to the range of the target (the range in this model affects only the conversion of $Z_y$ from distance to angle units). Vco90deg is the target velocity at which the target will have turned 90 degrees at time T; at lower velocities, the target will have turned further than 90 degrees since acceleration is held constant.

One second after the beginning of a 4 g maneuver (FIG. 2), a maneuver detection via the $V_{zx}$ parameter is expected, but only for targets with velocities less than 600 fps. For an observation received four seconds after the beginning of the maneuver (FIG. 3), a maneuver in detection in the $Z_x$ parameter for $V_t$ is expected at less than 400 fps, and via the $V_{zx}$ parameter for all target velocities on the graph. Using this model, $Z_y$ does not reach detectability at 4 g until about 5.5 seconds, and then only for $V_x>600$ fps (FIG. 5).

Assuming observations are spaced one frame apart, an average one half frame delay is added to obtain the expected maneuver detection time lag. For example, if we wish to detect a 5 g maneuver of a 676 fps target using the fastest parameter in this region ($V_{xx}$), the period required to obtain detectability is about 0.9 seconds (FIG. 6), so the total expected maneuver detection lag is 3.2 seconds.

In order to prove out the principles of the present invention, the present maneuver detector was added to a track-while-scan simulation, a large multiple target-track simulation. Several scenarios were used to make initial adjustments of the "tuning" constants. In most of the scenarios, 5 g turns were used with the target having a velocity of 676 fps (400 knots). This allows 6.6 seconds for the target to turn 90 degrees from nose to beam aspect.

The constants were adjusted for a false alarm period of approximately a minute; this corresponds to a false alarm probability of 0.038, or a threshold at the 2 sigma level (as it was set for the theoretical analysis). Maneuvers were typically detected between three and seven seconds after they were begun. (period measured from actual start of maneuver to the observation on which the detection threshold was passed). Performance predictions by the method of the theoretical analysis for a 5 g turn at 676 fps would indicate maneuver detectability at about 0.9 s. for $V_{xx}$, 4.0 s. for $Z_x$, and 4.9 s. for $Z_y$. Adding the average one half flame data sampling lag, we get a total maneuver detection time lag of 2.05 s. for $V_{xx}$, 5.15 s. for $Z_x$, and 6.05 s. for $Z_y$, reasonably consistent with the simulation results.

The maneuver detector 10 and processing method 20 has several applications for which it is readily applicable. The maneuver detector may be used to adjust track uncertainties sent to a missile, wherein the values are increased appropriately for targets that are determined to be maneuvering. The maneuver detector may be used to adjust azimuth and range-rate gates for maneuvering targets as a function of $PM_r$. The maneuver detector may be used to allocate more MPRF for maneuvering targets. The track-while-scan resource allocation function attempts to allocate the higher-accuracy accuracy MPRF mode for high priority targets which are determined to be maneuvering. The maneuver detector may be used to distinguish the effects of jet engine modulation (JEM) from target maneuvers by comparing the JEM-insensitive range-derived maneuver indications to those derived from range-rate.

It is to be understood that, while the above description is directed to an embodiment wherein histories and observations are maintained and processed in two-dimensions, dimensions, the present invention may be readily used to process and maintain histories and observations in three-dimensions. Accordingly, the present maneuver detection method is generally applicable to two- and three-dimensional processing embodiments without departing from the scope of the invention.

Thus, a dynamic inertial coordinate system maneuver detector that may be used during MPRF, HPRF, and interleaved track-while-scan tracking modes that improves tracking quality while tracking maneuvering targets has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. A maneuver detection method for use in a target tracking system disposed in a vehicle that is employed to detect a maneuvering target, said method comprising the steps of:

determining time-delayed target position and velocity estimates of a moving target and storing the time-delayed target position and velocity estimates in a history file;

continuously updating the time-delayed target position and velocity estimates by transforming them into an intermediate Cartesian coordinate system and correcting for motion of the vehicle;

for each measurement time, processing the updated time-delayed target position and velocity estimates to predict the position and velocity of the target in an observation-relative inertial coordinate system aligned with the line-of-sight between the aircraft and the target;

calculating an error between the predicted position and velocity of the target and the current observed position and velocity of the target; and calculating a maneuver probability that is indicative of whether the target is maneuvering using the error and predetermined measurement accuracies of the target tracking system.

2. A maneuver detection method for use in a target tracking system disposed in a vehicle that is employed to detect a maneuvering target, said method comprising the steps of:

estimating a predetermined parameter associated with a target at a time prior to a present observation time of the target;

predicting the predetermined parameter at the time of observation of the target, assuming constant-velocity, straight line motion of the target;

comparing the predicted parameter to an actual observation measurement of the parameter at the time of observation and processing residuals derived from the comparison to determine the probability that the target is maneuvering; and outputting a signal derived from the residual processing to provide a maneuver indication.

3. The method of claim 2 wherein the step of determining the probability that the target is maneuvering comprises the steps of:

comparing values derived from an observation to those predicted from histories of a best estimate of target position and velocity, which histories correspond to smoothed position and velocity values; and estimating maneuver probabilities indicative of the probability that the target is maneuvering.

4. The method of claim 3 wherein the smoothed position and velocity values correspond to a best estimate of target position and velocity.

5. The method of claim 3 wherein the step of estimating maneuver probabilities include probabilities corresponding to position along a line-of-sight direction to a target ($Z_x$), position in a cross-line-of-sight direction ($Z_y$), and velocity along the line-of-sight direction ($V_{xx}$).

6. A maneuver detection method for use in a target tracking system disposed in a vehicle that is employed to detect a maneuvering target, said method comprising the steps of:

generating a trackfile database that contains smoothed position and velocity estimate data of a moving target;

generating a navigation database that contains velocity and acceleration data for the vehicle;

processing the data from the trackfile and navigation databases to generate an updated history file containing target position and velocity estimates in platform-relative coordinates;

rotating the target position and velocity estimates from the history file into observation-relative inertial coordinates;

generating an observation database that contains observed data comprising range, range-rate, azimuth and elevation data of the target;

transforming the observed data into observation-relative inertial coordinates; and comparing the transformed data target position and velocity estimates to observed target position and velocity values and calculating probilities and confidence values indicative of whether the target is maneuvering.

7. A maneuver detector for use in a target tracking system disposed in a vehicle that is employed to detect a maneuvering target, said maneuver detector comprising:

a trackfile database that contains smoothed position and velocity estimate data of a moving target;

a navigation database that contains velocity and acceleration data for the vehicle;

an observation database that contains observed data comprising range, range-rate, azimuth and elevation data of the target; and a processor for processing the data from the trackfile and navigation databases to generate an updated history file containing target position and velocity estimates in platform-relative coordinates, for rotating the target position and velocity estimates from the history file into observation-relative inertial coordinates, for transforming the observed data into observation-relative inertial coordinates, and for comparing the transformed data target position and velocity estimates to observed target position and velocity values and calculating probilities and confidence values indicative of whether the target is maneuvering.

* * * * *

UNITED STATES PATENT AND TRADEMARK OFFICE
CERTIFICATE OF CORRECTION

PATENT NO : 5,631,653
DATED : May 20, 1997
INVENTOR(S): Robert W. Reedy

It is certified that error appears in the above-identified patent and that said Letters Patent is hereby corrected as shown below:

At column 1, line 8, insert the following as the first paragraph after the heading BACKGROUND OF THE INVENTION:

--This invention was made with Government support under Contract Number N00019-90-C-0159 awarded by the Naval Air Systems Command. The Government has certain rights in this invention.--

Signed and Sealed this

Twenty-eighth Day of November, 2000

*Attest:*

Q. TODD DICKINSON

*Attesting Officer*  *Director of Patents and Trademarks*